United States Patent [19]

Teter et al.

[11] Patent Number: 5,584,998
[45] Date of Patent: Dec. 17, 1996

[54] SELF-ADJUSTING FILTER DIFFUSER AND METHOD FOR ASSEMBLING SAME IN A FILTER HOUSING

[75] Inventors: Edward C. Teter, North Caldwell; Thomas D. Searl, Hamilton Township, both of N.J.

[73] Assignee: H-Tech, Inc., Wilmington, Del.

[21] Appl. No.: 591,749

[22] Filed: Jan. 25, 1996

[51] Int. Cl.[6] ................................. B01D 27/08
[52] U.S. Cl. .................... 210/405; 210/418; 210/435; 210/456
[58] Field of Search ................................. 239/200, 201, 239/207, 269, 395, 456, 600; 210/263, 265, 279, 287, 405, 418, 435, 456

[56] References Cited

U.S. PATENT DOCUMENTS

| | | |
|---|---|---|
| 1,015,051 | 1/1912 | Martin . |
| 3,493,116 | 2/1970 | Edmiston . |
| 3,625,365 | 12/1971 | Armstrong et al. . |
| 3,717,081 | 2/1973 | Jakimas . |
| 3,747,768 | 7/1973 | Barrera . |
| 4,169,793 | 10/1979 | Lockshaw . |
| 5,067,559 | 11/1991 | Perkinson . |
| 5,068,033 | 11/1991 | Tobias et al. . |
| 5,472,609 | 12/1995 | Field ........................ 210/279 |

*Primary Examiner*—W. L. Walker
*Attorney, Agent, or Firm*—Selitto & Associates

[57] ABSTRACT

A diffuser, which is adapted for use in a filter, includes a pair of tiers. Once of the tiers is supported on and is laterally movable relative to the other tier in response to contact by a closure dome as the dome is applied to an access opening formed in a housing of the filter, whereby the diffuser automatically and properly adjusts itself in relation to the access opening during its assembly in the housing.

8 Claims, 3 Drawing Sheets

5,584,998

SELF-ADJUSTING FILTER DIFFUSER AND METHOD FOR ASSEMBLING SAME IN A FILTER HOUSING

FIELD OF THE INVENTION

The present invention relates to filter diffusers, and, more particularly, to self-adjusting filter diffusers adapted for facilitating the assembly thereof in an associated filter housing and methods for such assembly.

BACKGROUND OF THE INVENTION

Various diffusers have been utilized in filters, such as a sand filter, for distributing unfiltered fluid to filtering media positioned therebelow. For instance, U.S. Pat. No. 3,493,116 discloses a swimming pool filter equipped with an overdrain which includes a disk-like head immovably mounted on the top end of an upright pipe by a conical fitting.

Double-tiered diffusers have also been used in connection with filters in the past. More particularly, such a diffuser typically includes an upper tier, which has an outer tubular extension projecting downwardly therefrom. The filter diffuser is also provided with a lower tier having a trough, which is mounted at an upper end thereof for supporting the upper tier thereon, and an inner tubular extension, which projects upwardly from the trough. The inner tubular extension of the lower tier is snap-fitted into the outer tubular extension of the upper tier, whose inner diameter is substantially equal to the outer diameter of the inner tubular extension, such that a tight fit is formed between the outer and inner tubular extensions, thereby inhibiting the upper tier from moving laterally relative to the lower tier. In such circumstances, when a closure dome is applied to an access opening during the assembly of the diffuser in an associated filter housing so as to seal the access opening and so as to secure the diffuser, the diffuser cannot adjust itself in response to the dome's application if the upper tier is not properly centered in relation to the access opening. This generally results in the diffuser being installed in an improper orientation and thereby causes stress on various pipe joints associated with the diffuser.

SUMMARY OF THE INVENTION

The present invention overcomes the disadvantages and shortcomings of the prior art discussed above by providing a new and improved filter diffuser adapted to adjust itself automatically and properly in relation to an access opening of an associated filter housing. More particularly, the diffuser includes a lower tier and an upper tier supported on a trough of the lower tier. A substantially loose fit is provided between the upper and lower tiers so as to allow the upper tier to move laterally relative to the lower tier in response to contact by a closure dome as the dome is applied to the access opening. In this manner, the diffuser automatically and properly adjusts itself in relation to the access opening during its assembly in the filter housing.

BRIEF DESCRIPTION OF THE DRAWINGS

For a more complete understanding of the present invention, reference is made to the following detailed description of an exemplary embodiment considered in conjunction with the accompanying drawings, in which.

DETAILED DESCRIPTION OF THE EXEMPLARY EMBODIMENT

Although the present invention can be used in conjunction with any type of device equipped with a diffuser, it is particularly suitable for use in connection with a sand filter. Accordingly, the present invention will be described hereinafter in connection with such a filter. It should be understood, however, that the following description is only meant to be illustrative of the present invention and is not meant to limit the scope of the present invention.

Figure 1:
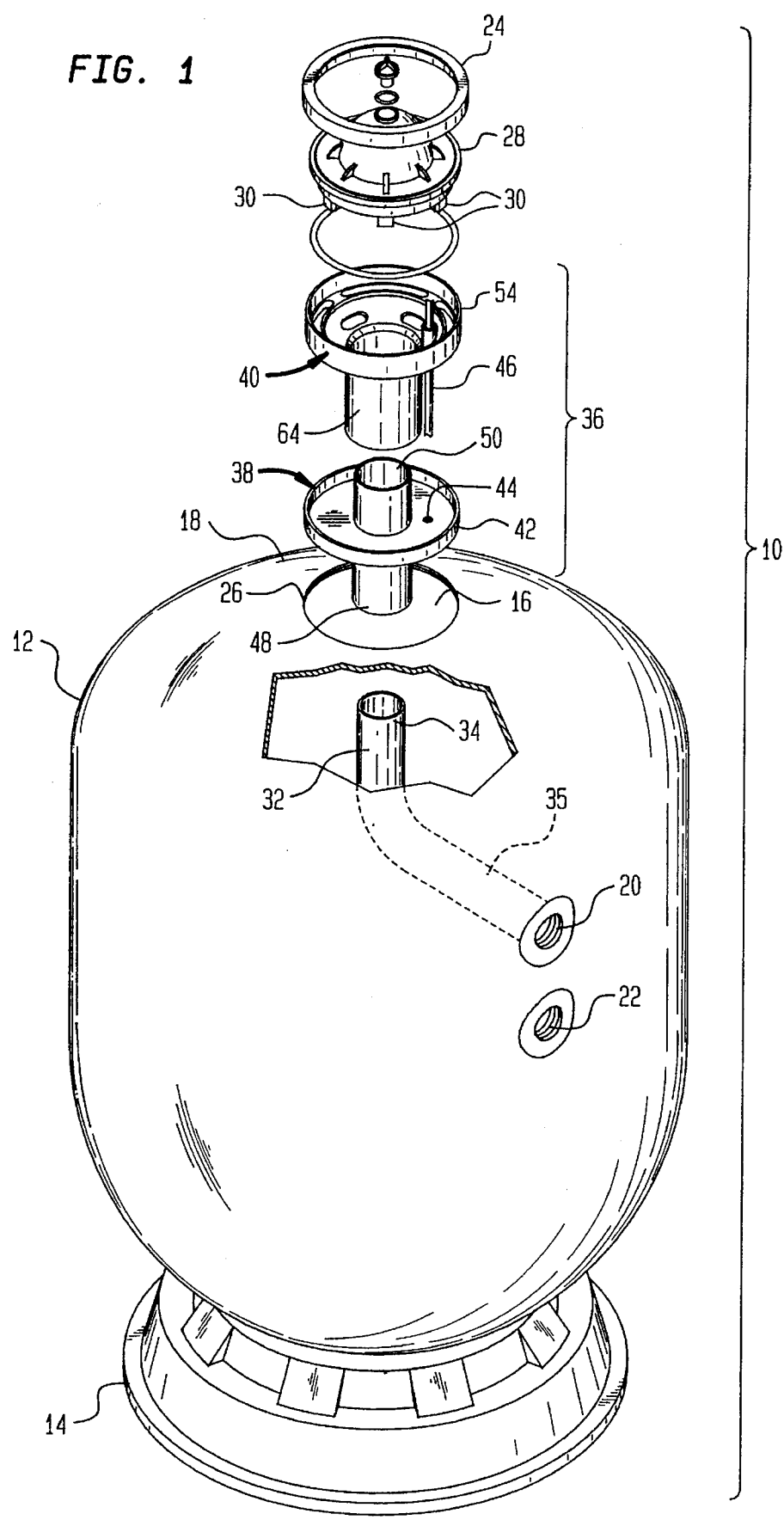
FIG. 1 is a partially cut-away and partially exploded perspective view of a filter which is equipped with a diffuser constructed in accordance with the present invention.

Referring to FIG. 1, a sand filter 10 includes a housing 12 and a base 14 for supporting the housing 12 thereon. More particularly, the housing 12 is provided with an access opening 16 formed in a top end 18 thereof and with an inlet opening 20 and an outlet opening 22 formed in a sidewall thereof. A flange clamp 24 is mounted on a periphery 26 of the access opening 16 of the housing 12, while a top closure dome 28 is threaded onto the flange clamp 24 for sealing the access opening 16. The dome 28 has a plurality of securing tabs 30 depending therefrom for purposes to be discussed hereinafter. In addition, the filter 10 includes an upper elbow pipe 32, which is mounted within the housing 12 and which has an upper end 34 and an opposite end 35 connected to the inlet opening 20, and a lower elbow pipe (not shown) which is mounted within the housing 12 and which has an end connected to the outlet opening 22.

Figure 2:
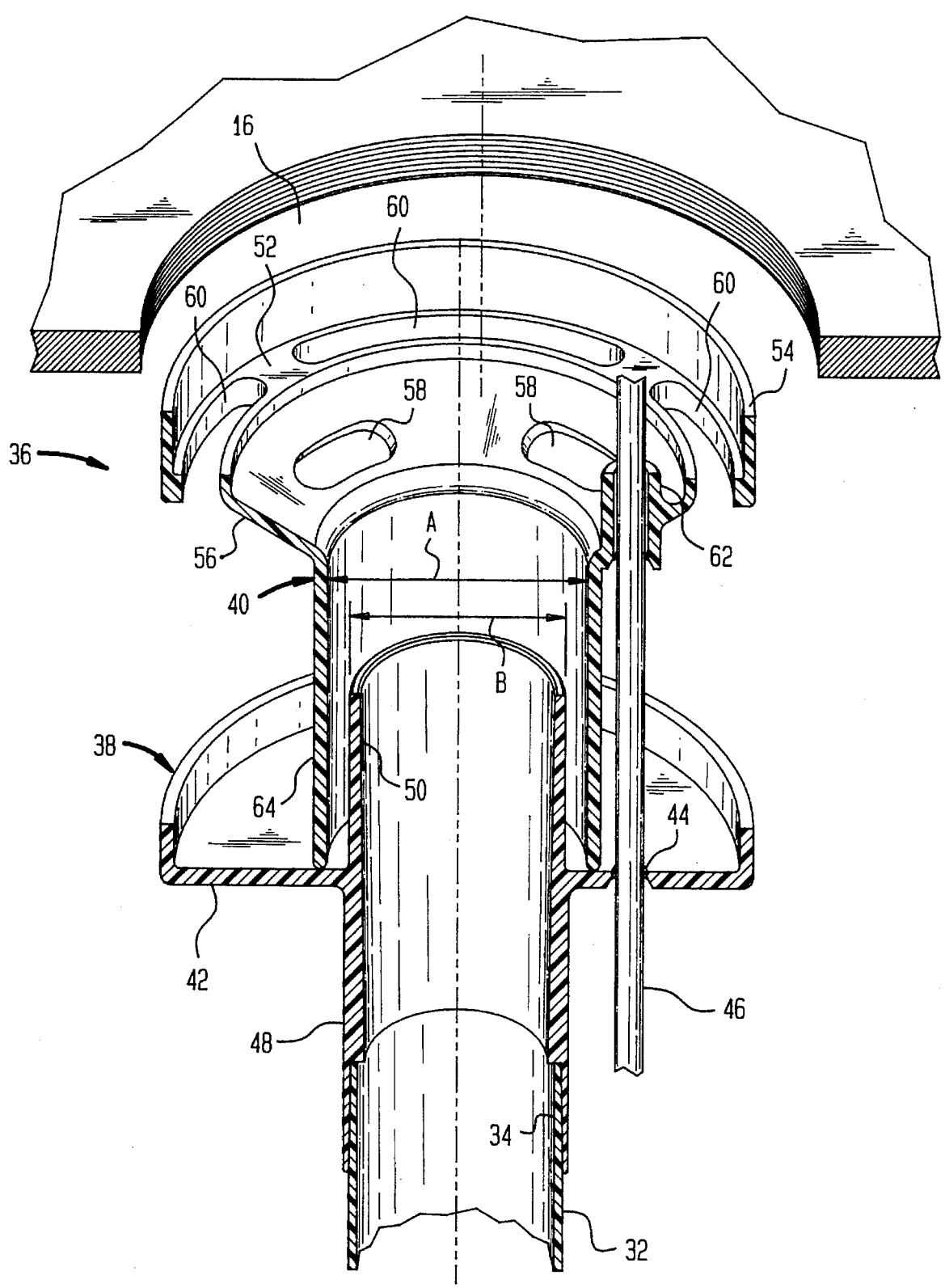
FIGS. 2 and 3 are detailed cross-sectional views of the diffuser shown in FIG. 1 during its assembly in the filter.

With reference to FIGS. 1 and 2, a diffuser 36 is mounted within the housing 12 and is supported on the upper end 34 of the upper elbow pipe 32. More particularly, the diffuser 36, which is provided with a double-tiered construction, includes a lower tier 38 and an upper tier 40. The lower tier 38 is provided with a trough 42 extending outwardly therefrom and having a hole 44 for accommodating an air tube 46. A lower tubular extension 48 projects downwardly from the trough 42, while an upper tubular extension 50 projects upwardly from the trough 42. The lower extension 48 is sized and shaped so as to receive the upper end 34 of the upper elbow pipe 32.

Still referring to FIGS. 1 and 2, the upper tier 40, which is supported on the lower tier 38, includes a ledge portion 52, which is provided with a peripheral wall 54, and a conical portion 56 mounted below the ledge portion 52. Diffuser holes 58, 60 are formed in the conical portion 56 and the ledge portion 52, respectively, in circular fashion, while a channel 62 extends upwardly from the conical portion 56 for accommodating the air tube 46. The upper tier 40 also includes a lower tubular extension 64 projecting downwardly from the conical portion 56 and resting on the trough 42 of the lower tier 38. The lower extension 64 of the upper tier 40 is sized and shaped so as to loosely receive the upper extension 50 of the lower tier 38. More particularly, the lower extension 64 has an inner diameter (indicated by a double-headed arrow A in FIG. 2) which is substantially larger than an outer diameter (indicated by a double-headed arrow B in FIG. 2) of the upper extension 50 so as to provide a loose fit between the lower extension 64 of the upper tier 40 and the upper extension 50 of the lower tier 38. In this manner, substantial lateral play is permitted between the upper and lower extensions 50, 64, thereby allowing the upper tier 40 to move laterally relative to the lower tier 38 during the assembly of the diffuser 36 in the filter 10 as discussed in greater detail hereinafter.

Figure 3:
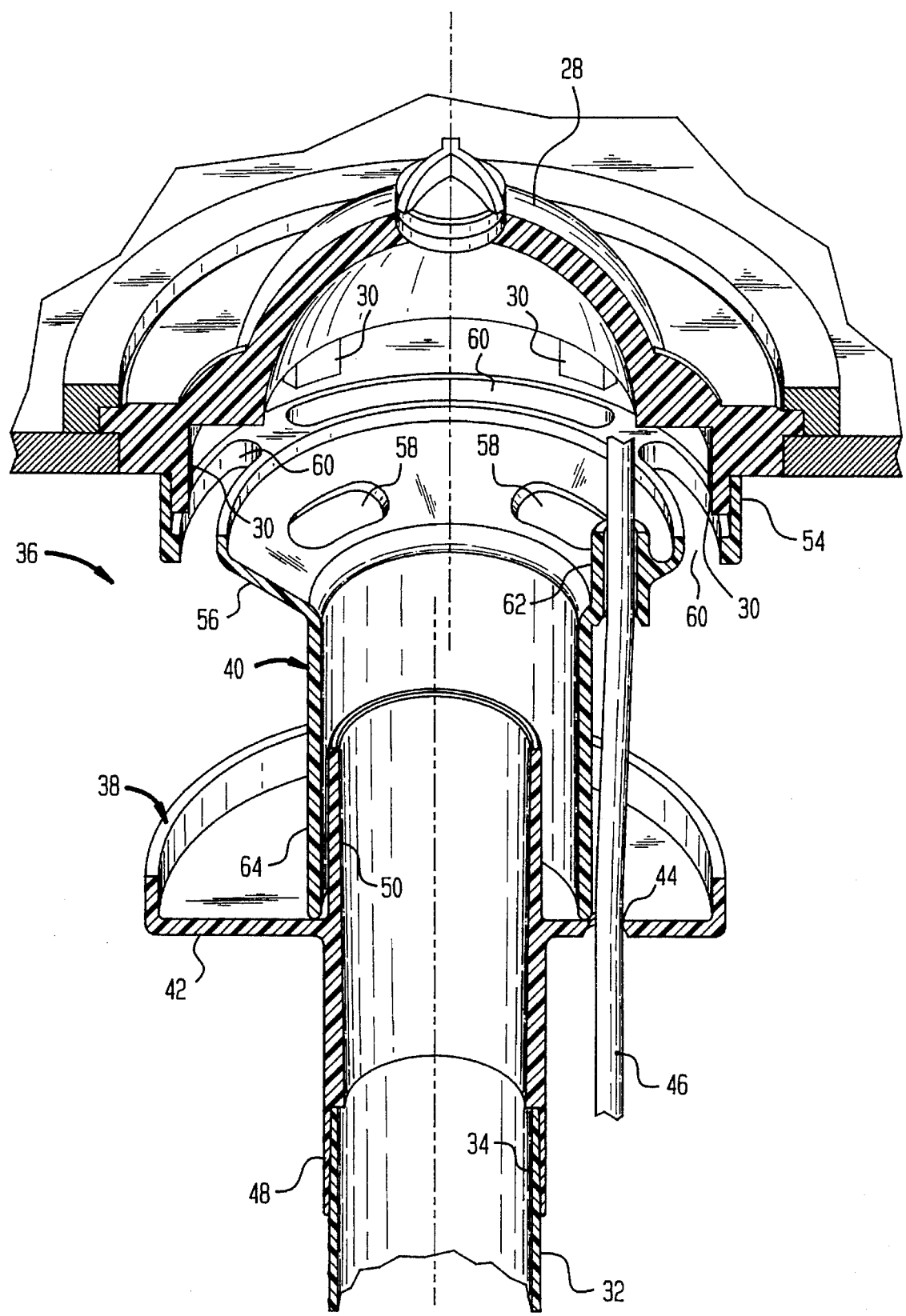

In order to assemble the diffuser 36 in the housing 12 of the filter 10, after the upper elbow pipe 32 and the lower elbow pipe are installed within the housing 12, the lower extension 48 of the lower tier 38 is immovably coupled to the upper end 34 of the upper elbow pipe 32 (see FIG. 2). Next, the upper tier 40 is placed on the trough 42 of the lower tier 38 by positioning the upper extension 50 of the lower tier 38 in the lower extension 64 of the upper tier 40 (see FIG. 2). The dome 28 is then applied to the access opening 16 so as to seal the access opening 16 and to secure the diffuser 36 within the housing 12 (see FIG. 3). More particularly, as the dome 28 is threaded onto the flange clamp 24, the tabs 30 of the dome 28 engage the peripheral wall 54 of the upper tier 40. In response to such engagement between the dome 28 and the upper tier 40, the upper tier 40 moves so as to properly adjust itself in relation with the access opening 16.

Once assembled, the filter 10 and the diffuser 36 operate in a conventional manner. For instance, unfiltered fluid, such as water, is conveyed to the diffuser 36 from a pump (not shown) through the upper elbow pipe 32. The fluid passes through the lower tier 38 into the upper tier 40, and after flowing over the conical portion 56 and the ledge portion 52 of the upper tier 40, it falls onto the trough 42 of the lower tier 38 through the holes 58, 60 of the conical portion 56 and the ledge portion 52, respectively. The fluid is then distributed onto a filtering medium (not shown), such as a sand bed. After passing through the filtering medium, the fluid is collected through a collecting mechanism, such as a lateral assembly, and is then conveyed to an external receiving pipe (not shown) through the lower elbow pipe.

It should be appreciated that the diffuser 36 overcomes the problems and shortcomings associated with the prior art diffusers discussed above. For instance, because of the loose fit between the upper and lower extensions 50, 64, even if the diffuser 36 is not properly centered in relation to the access opening 16 prior to the dome's application (see FIG. 2), the upper tier 40 of the diffuser 36 moves in response to contact by the dome 28 so as to adjust itself automatically and properly in relation to the access opening 16 (see FIG. 3). As a result, the assembly of the diffuser 36 in the housing 12 is rendered easy and efficient. This self-adjusting capability of the diffuser 36 is especially appreciable when the diffuser 36 is utilized in a filter housing formed by a blow molding process. Because such a filter housing has uneven thickness, it is particularly difficult to properly center a conventional diffuser in relation with an access opening. Because of the self-adjusting capability, proper centering of the diffuser 36 prior to the dome's application is made unnecessary.

It will be understood that the embodiment described herein is merely exemplary and that a person skilled in the art may make many variations and modifications without departing from the spirit and scope of the invention. All such variations and modifications are intended to be included within the scope of the invention as defined in the appended claims.

We claim:

1. In combination, a filter including a housing, which includes an access opening at a top end thereof, and a closure dome, which is sized and shaped so as to seal said access opening; and a diffuser having a first tier and a second tier, which includes supporting means for supporting said first tier thereon so as to allow said first tier to move laterally relative to said second tier in response to contact by said dome as said dome is applied to said access opening, whereby said diffuser automatically and properly adjusts itself in relation to said access opening during its assembly in said housing.

2. The combination of claim 1, wherein a loose fit is formed between said first and second tiers for allowing said first tier to move laterally relative to said second tier.

3. The combination of claim 2, wherein said second tier further includes a tubular extension extending from said supporting means; and wherein said first tier includes receiving means for loosely receiving said tubular extension therein.

4. The combination of claim 3, wherein said tubular extension includes an outer diameter; and wherein said receiving means includes another tubular extension extending therefrom, said another tubular extension being sized and shaped so as to receive said tubular extension therein and having an inner diameter which is substantially greater than said outer diameter so as to form a loose fit between said tubular extensions.

5. The combination of claim 4, wherein said housing further includes at least one pipe mounted therewithin; and wherein said second tier further includes coupling means for immovably coupling said second tier on said at least one pipe.

6. A method for assembling a diffuser, which includes upper and lower tiers, in a filter housing, comprising the steps of mounting said lower tier on a pipe fixedly within said housing; movably positioning said upper tier on said lower tier about an access opening formed in said housing; and applying a closure dome to said access opening such that said upper tier moves laterally relative to said lower tier in response to contact by said dome as said dome is applied to said access opening, whereby said diffuser automatically and properly adjusts itself in relation to said access opening during its assembly in said housing.

7. The method of claim 6, further comprising providing a loose fit between said upper and lower tiers so as to allow said upper tier to move laterally relative to said lower tier.

8. The method of claim 7, wherein said mounting step includes immovably mounting said lower tier relative to said pipe.

\* \* \* \* \*